Figure 2:
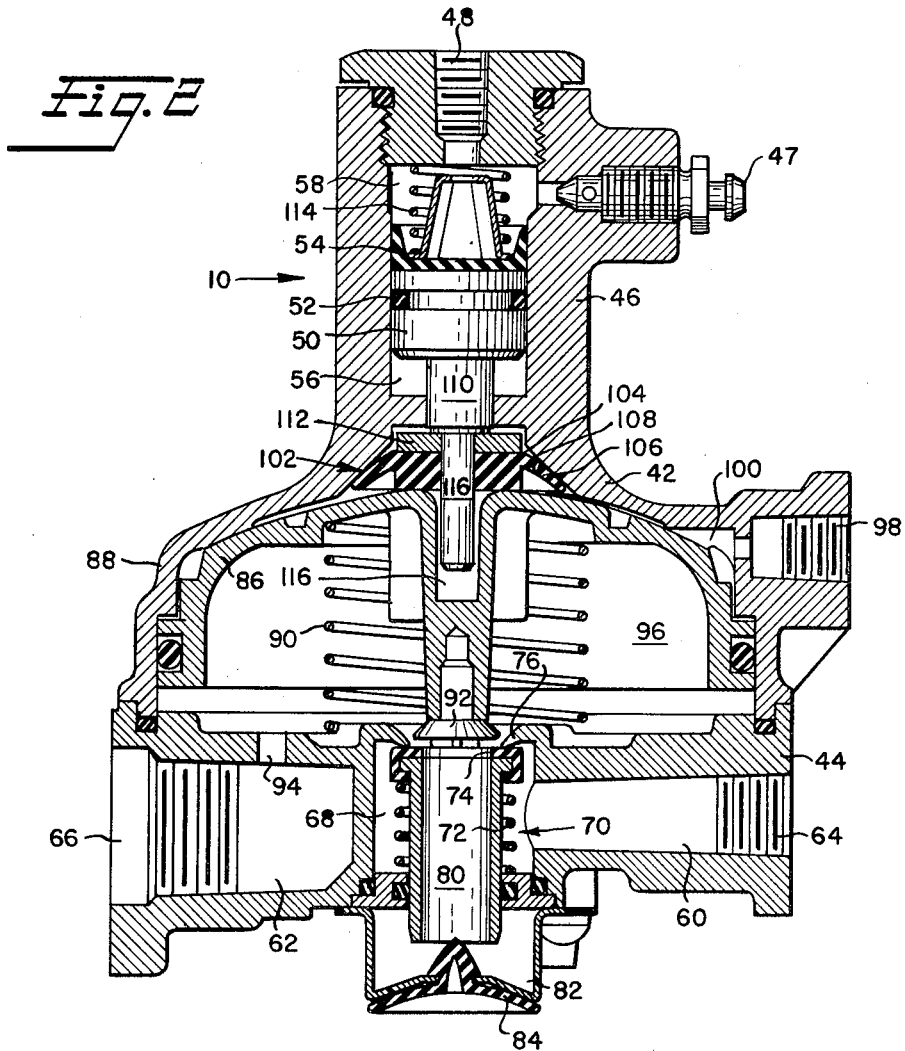

United States Patent [19]
Deem

[11] 3,712,340
[45] Jan. 23, 1973

[54] HYDRAULIC AND AIR OPERATED RELAY VALVE

[75] Inventor: Brian C. Deem, Avon Lake, Ohio

[73] Assignee: Bendix-Westinghouse Automotive Air Brake Company, Elyria, Ohio

[22] Filed: March 19, 1971

[21] Appl. No.: 126,088

[52] U.S. Cl. ............. 137/627.5, 251/26, 303/14
[51] Int. Cl. ............................................. F16k 31/12
[58] Field of Search ............ 137/116.3, 116.5, 627.5; 303/13, 14, 54; 251/26; 91/427, 433

[56] References Cited

UNITED STATES PATENTS

| | | |
|---|---|---|
| 2,998,284 | 8/1961 | Kirk.................................303/14 X |
| 3,545,205 | 12/1970 | Fujita...............................303/13 X |
| 3,580,646 | 5/1971 | Ternent............................303/54 X |
| 2,726,738 | 12/1955 | Fawick............................303/13 UX |

Primary Examiner—Robert G. Nilson
Attorney—Scrivener, Parker, Scrivener & Clarke

[57] ABSTRACT

In a braking arrangement especially adapted for tractor-trailer vehicle brakes wherein the tractor includes hydraulically operated brakes and the trailer is equipped with compressed air operated brakes, the provision of a relay valve on the tractor for controlling the trailer brakes, the relay valve being selectively operable by hydraulic pressure when the tractor brakes are applied or by a separate source of compressed air carried by the tractor.

4 Claims, 2 Drawing Figures

PATENTED JAN 23 1973

3,712,340

INVENTOR
BRIAN C. DEEM

BY
Scrivener Parker Scrivener & Clarke
ATTORNEYS

HYDRAULIC AND AIR OPERATED RELAY VALVE

DESCRIPTION OF THE INVENTION

It has heretofore been proposed to provide hydraulic braking systems for tractor and trailer vehicles wherein, after the vehicles and braking systems thereon have been coupled, the hydraulic brakes on both vehicles have been controlled by the operator on the tractor. Such constructions however have not been entirely satisfactory due to the problem of interconnecting the hydraulic braking systems of the vehicles. A more conventional arrangement is to equip the tractor with a hydraulic brake system and the trailer with a pneumatic brake system and provide suitable connections on the vehicles to connect the systems in operative relationship when the vehicles are coupled together.

The present invention is directed to systems of the latter type and the principal object of the invention is to provide a novel relay valve which is positioned on the tractor and is so constructed and arranged as to control the application of the pneumatic brakes on the trailer simultaneously with the application of the hydraulic brakes on the tractor.

A further object of the invention is to provide in a system of the above type, a relay valve construction for controlling trailer brake application which may be operated either by the tractor hydraulic brake system or by a source of compressed air located on the tractor.

Another object is to provide a relay valve of the foregoing character wherein the trailer braking pressure may be graduated, regardless of whether the relay valve is operated by hydraulic pressure or compressed air.

Still another object resides in the constructional details of the relay valve whereby a graduated application or compressed air to the trailer brake system is assured and the hydraulic and compressed air systems for selectively controlling the relay valve are effectively isolated from each other.

Other objects and novel features of the invention will appear more fully hereinafter from a consideration of the following detailed description when taken in connection with the accompanying drawing. It will be expressly understood however, that the drawing is utilized for purposes of illustration only and is not to be taken as a definition of the limits of the invention, reference being had for this purpose to the appended claims.

Figure 1:
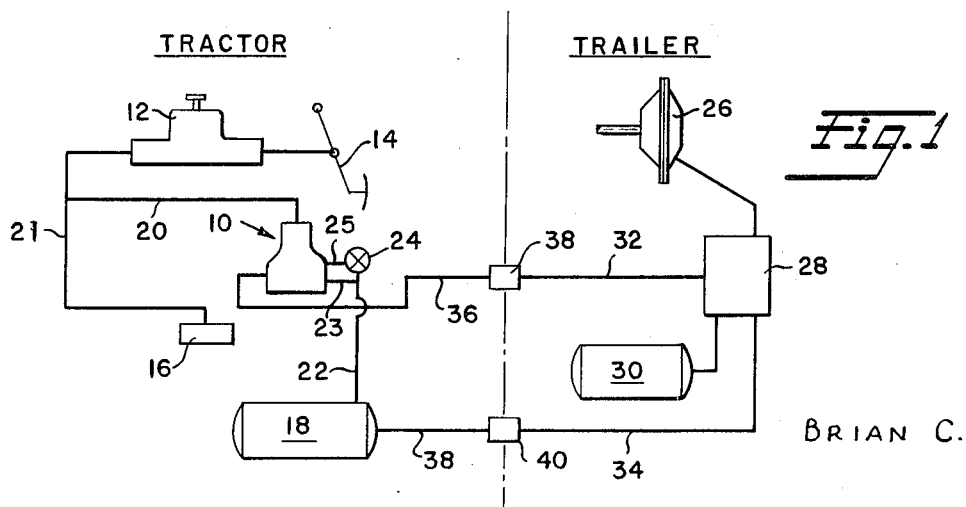

In the drawing wherein similar reference characters denote similar parts throughout the several views:

FIG. 1 is a diagrammatic view of a tractor-trailer braking system employing the relay valve of the present invention, and FIG. 2 is a vertical sectional view of the relay valve.

Referring more particularly to FIG. 1, the novel relay valve 10 of the present invention is illustrated as being incorporated in a tractor hydraulic brake system of conventional construction which includes a master cylinder 12, a brake pedal 14 and a plurality of wheel cylinders, one of which is shown at 16. A reservoir 18 is also located on the tractor and is supplied with compressed air from a suitable compressor (not shown). The relay valve 10 is connected by a conduit 20 with the conduit 21 which supplied hydraulic pressure to the wheel cylinder 16, and is also connected with the reservoir 18 by supply conduits 22 and 23. A trailer brake control valve 24, which may be of the conventional graduating type is connected to the relay valve 10 by a conduit 25 and is also connected to the conduit 22, the valve 24 being provided for separately controlling the trailer brake in a manner which will appear more fully hereinafter.

As shown, the tractor brake system just described is connected in the usual manner with a conventional trailer compressed air braking system which comprises a plurality of brake chambers, one of which is shown at 26, a relay emergency valve 28, a trailer reservoir 30 and trailer service and emergency conduits 32 and 34. The relay valve 10 is connected to the trailer service conduit 32 through a tractor service conduit 36 and the usual coupling 38, while the tractor reservoir 18 is connected with the trailer emergency conduit 34 by way of the tractor emergency conduit 38 and the usual coupling 40. As will appear from the following, application of the tractor hydraulic braking system will, through operation of the relay valve 10, charge the service conduits 36 and 32 and effect compressed air operation of the trailer brake chambers 26 through the conventional operation of the relay emergency valve 28. Should it be desirable to operate the trailer brakes alone, it is only necessary to open valve 24 whereupon the relay valve 10 will operate as just described.

Referring now to FIG. 2, the novel relay valve of the present invention is shown therein as including upper and lower interconnected casing sections 42 and 44, the upper section being formed to provide a cylinder 46 which is in constant communication with the hydraulic conduit 20 through port 48. A conventional bleeder connection 47 communicates with the cylinder 46. A piston 50 is slidably mounted in the cylinder 46 and is provided with the usual seals 52 and 54 for isolating the chambers 56 and 58 on opposite sides of the piston. The lower casing section 44 is formed to provide inlet and outlet chambers 60 and 62 which are respectively provided with ports 64 and 66, port 64 being connected with the supply conduit 23 while the port 66 is connected with the tractor service conduit 36. As shown, the lower casing section 44 is also provided with a valve inlet cavity 68 which communicates with the inlet chamber 60 and a combined inlet and exhaust valve 70 is positioned within the cavity 68 and is resiliently urged by a spring 72 so that the upper valve portion 74 engages a valve seat 76. Valve 70 is formed to provide a through bore 80 which is in constant communication with the atmosphere by way of an exhaust chamber 82 and a rubber check valve 84.

In order to control the operation of the valve 70, the invention provides a cup-shaped relay piston 86 which is positioned in the enlarged portion 88 of the upper casing section 42, the piston being normally urged to the normal position shown by a spring 90. In such position, a valve actuating member 92 carried by the piston is normally spaced above the valve portion 74 of the valve 70 so that the tractor service conduit 36 is connected to atmosphere by way of port 66, outlet chamber 62, port 94, chamber 96 beneath the piston 86, bore 80 and exhaust chamber 82. Thus, in the normal position of the piston 86, as illustrated, the tractor and trailer service lines 36 and 32 are exhausted and the trailer brake chambers 26 will remain in inactive condition. In the event however, that the piston 86 is moved downwardly as viewed in FIG. 2 so that the member 92 engages portion 74 to move valve 70 away from sealing engagement with the valve seat 76, it will be understood that compressed air will charge the tractor and trailer service lines 36 and 32 to apply the trailer brakes in well known manner. When such action occurs, compressed air will be conducted to the tractor service line 36 from the reservoir 18 by way of conduits 22, 23, port 64, inlet chamber 60, chamber 96, port 94, outlet chamber 62 and port 66.

An important feature of the invention resides in constructing the relay valve 10 in such a manner that it may be selectively operated either by the tractor hydraulic brake system or by compressed air from the reservoir 18 through manipulation of the valve 24. As shown in FIG. 2, the casing portion 42 of the relay valve 10 is provided with an inlet port 98 to which the conduit 26 is connected in order to conduct compressed air to a control chamber 100 above the relay piston 86 whenever the valve 24 is opened. When this occurs, compressed air within the chamber 100 will cause downward movement of the piston 86 to move the valve 70 to open position and charge the tractor service line 36 as above described. Since the chamber 96 beneath the piston 86 is subjected to the pressure of the fluid conducted to the tractor service line as well as the force exerted by the spring 90, it will be understood that the valve 70 will return to a lapped position as soon as such pressures approximate the pressure of the fluid within the chamber 100 and in this respect, the operation is similar to that of conventional relay valves.

A further important feature of the invention resides in a novel arrangement for isolating the chamber 56 beneath the piston 50 from the control chamber 100. As shown, this includes a check valve 102 of resilient and rubbery material which not only functions as a check valve and seal between chambers 56 and 100 but also as a graduating spring between the hydraulic piston 50 and the relay piston 86 when the piston 50 is moved in response to the operation of the tractor hydraulic brake system. More particularly, the check valve 102 is formed with a central body portion 104 which is provided with a peripheral lip 106, the arrangement being such that because of the expansive force of the spring 90, the lip 106 will be resiliently forced into contact with a peripheral seat 108. It will also be understood that when the control chamber 100 is charged with compressed air, the lip will be forced tightly against the seat 108 thus preventing communication between the chamber 100 and the chamber 56. Piston 50 is provided with an abutment 110 which engages a washer 112 on the upper face of the body portion 104 through the action of a spring 114, the abutment having an extension 116 protruding through the body portion 104 and being received within a recess 116 formed in the relay piston 86.

In operation, movement of the pedal 14 will effect hydraulic operation of the tractor brake system through the master cylinder 12 and wheel cylinders 16 in well known manner. At the same time, the piston 50 of the relay valve 10 will be subjected to hydraulic pressure delivered by the master cylinder 12 and downward movement of the piston causes corresponding movement of the relay piston 86 through the combined check valve and seal 102 in order to open the valve 70 and charge the tractor and trailer service lines 36 and 32 as above described. As heretofore pointed out, the trailer brake system will then be charged with compressed air through operation of the relay emergency valve 28. Since the check valve 102 is formed of resilient and rubbery material, it will be appreciated that it acts as a graduating spring between the hydraulic piston 50 and the relay piston 86 such that the valve 70 will return to a lapped position as soon as the pressure beneath the piston 86 in combination with the pressure exerted by the spring 90 approximates the pressure applied by the piston 50. In this manner, the pressure in the trailer braking system may be graduated in accordance with the tractor braking pressure applied to the piston 50.

When the pedal 14 is released, it will be understood that the parts of the relay valve 10 will return to the positions shown in FIG. 2 due to the action of the spring 90 and the spring effect of the check valve 102. Valve 70 will thereupon return to seating engagement with the seat 76 and since the member 92 will move away from contact with the valve portion 74, the tractor and trailer service lines will be exhausted through the bore 80 and exhaust chamber 82. The trailer braking system will thereupon be exhausted through the normal operation of the relay emergency valve 28.

Should it be desirable to operate the trailer braking system separately from the tractor braking system, it is only necessary to open valve 24 in order to conduct compressed air from the tractor reservoir 18 to the chamber 100 of the relay valve 10. As heretofore described, this will cause downward movement of the relay piston 86 in order to open the valve 70 to charge the tractor and trailer service lines 36 and 32. As understood, pressure in the chamber 100 will expand the lip seal 106 of the check valve 102 in order to effectively seal communication between chambers 100 and 56 and thus prevent any loss of pressure from the former.

There has thus been provided by the present invention, a novel hydraulic-air relay valve which is not only effective to graduate operation of the trailer air brake system in accordance with the operation of the tractor hydraulic braking system but is also capable of compressed operation from a source of compressed air on the tractor independently of the tractor braking system. The provision of the novel resilient check valve 102 also provides an efficient seal between the compressed air chamber 100 and the chamber 56 beneath the hydraulic piston 50 as well as functioning as a graduating spring during hydraulic operation of the said piston.

While the invention has been described herein with considerable particularity, it will be understood that the scope thereof is to be determined by the appended claims.

What is claimed is:

1. In a relay valve comprising a casing having an outlet port, an inlet port and a cavity, a pressure responsive member positioned in said cavity and dividing the latter into an outlet chamber and a control chamber, said outlet port being in constant communication with said outlet chamber, a normally closed valve for preventing communication between said inlet port and said outlet chamber while connecting the latter to the atmosphere, a spring acting on said pressure responsive member to normally move the latter in one direction so that said valve occupies its normally closed position, the improvement which comprises means for selectively moving said pressure responsive member in the opposite direction to operate said valve for closing communication between the outlet chamber and atmosphere and for opening communication between the outlet chamber and said inlet port, said last named means including a hydraulically operated piston, resilient graduating means operatively connecting said piston and pressure responsive member and means for admitting compressed air to said control chamber.

2. A relay valve as set forth in claim 1 which comprises in addition, a cylinder in which the hydraulic piston is mounted for reciprocal movement and a check valve for sealing communication between the control chamber and the cylinder.

3. A relay valve as set forth in claim 2 wherein the check valve and graduating means constitute a unitary member positioned between the piston and pressure responsive member.

4. A relay valve as set forth in claim 3 wherein the check valve is provided with a peripheral sealing lip in constant engagement with a peripheral seat formed in the casing.

* * * * *